(12) United States Patent
Schütz

(10) Patent No.: US 7,111,868 B2
(45) Date of Patent: Sep. 26, 2006

(54) STEERING WHEEL

(75) Inventor: Dominik Schütz, Waldaschaff (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 340 days.

(21) Appl. No.: 10/690,005

(22) Filed: Oct. 21, 2003

(65) Prior Publication Data

US 2004/0090051 A1 May 13, 2004

(30) Foreign Application Priority Data

Oct. 30, 2002 (DE) ................ 202 16 755

(51) Int. Cl.
*B60R 21/16* (2006.01)
(52) U.S. Cl. ............. 280/731; 200/61.54; 200/61.55
(58) Field of Classification Search ............ 280/728.2, 280/731; 74/552; 200/61.54, 61.56, 61.55, 200/61.57
See application file for complete search history.

(56) References Cited

U.S. PATENT DOCUMENTS

| | | | |
|---|---|---|---|
| 4,934,735 A | 6/1990 | Embach | |
| 5,348,340 A * | 9/1994 | Humphreys et al. | 280/728.2 |
| 5,431,438 A | 7/1995 | Manabe | |
| 5,542,694 A * | 8/1996 | Davis | 280/728.3 |
| 5,569,893 A * | 10/1996 | Seymour | 200/61.54 |
| 5,678,849 A * | 10/1997 | Davis | 280/728.3 |
| 5,730,459 A * | 3/1998 | Kanda | 280/731 |
| 6,062,595 A | 5/2000 | Ha | |
| 6,150,621 A * | 11/2000 | Nishitani et al. | 200/61.54 |
| 6,250,666 B1 * | 6/2001 | Ross | 280/728.2 |
| 6,312,012 B1 * | 11/2001 | Bohn et al. | 280/731 |
| 6,349,616 B1 * | 2/2002 | Onodera et al. | 74/552 |
| 6,426,473 B1 * | 7/2002 | Derrick et al. | 200/61.54 |
| 6,478,330 B1 * | 11/2002 | Fujita | 280/731 |
| 6,719,323 B1 * | 4/2004 | Kai et al. | 280/731 |
| 6,739,620 B1 * | 5/2004 | Derrick | 280/731 |
| 6,849,816 B1 * | 2/2005 | Rumpf | 200/61.54 |
| 6,907,328 B1 * | 6/2005 | Fehr et al. | 701/29 |
| 6,941,836 B1 * | 9/2005 | Umemura et al. | 74/552 |
| 2001/0052694 A1 | 12/2001 | Schutz | |
| 2002/0113419 A1 | 8/2002 | Kai et al. | |

FOREIGN PATENT DOCUMENTS

| | | |
|---|---|---|
| DE | 20116306 | 3/2002 |
| EP | 1164054 | 6/2001 |
| EP | 1172256 | 1/2002 |

* cited by examiner

*Primary Examiner*—Paul N. Dickson
*Assistant Examiner*—Toan C. To
(74) *Attorney, Agent, or Firm*—Tarolli, Sundheim, Covell & Tummino LLP

(57) ABSTRACT

A steering wheel comprises a gas bag module having a visible front side (26) with a gas generator carrier (17) on which a gas generator (21) is mounted, and several switches (15). The gas generator carrier (17) extends to close to the front side (26) of said gas bag module and forms at least one section of a common accommodation housing to accommodate said several switches (15).

11 Claims, 3 Drawing Sheets

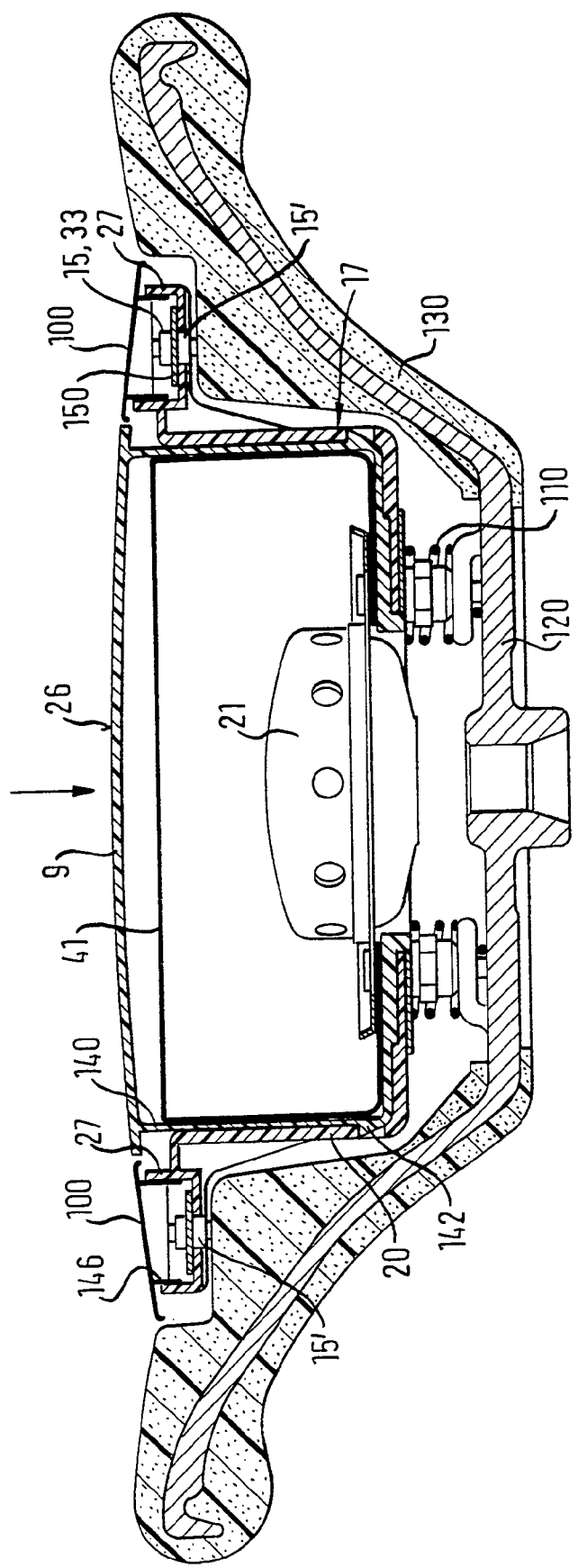

STEERING WHEEL

TECHNICAL FIELD

The invention relates to a steering wheel comprising a gas bag module.

BACKGROUND OF THE INVENTION

Conventional gas bag modules typically have a visible front side, a gas generator carrier on which a gas generator is mounted, and several switches.

Gas generator carriers are sheet metal or plastic parts which, as it were, form the bridge between the gas generator and the steering wheel skeleton. The gas generator is mounted usually directly on the gas generator carrier and the latter is in direct or indirect connection with the steering wheel skeleton, the latter connection especially being available in a so-called "floating horn module".

Modern steering wheels are increasingly also provided with switches, e.g. for operating telephone or radio or for operating an on-board computer. These switches are usually arranged adjoining the gas bag module to the left and right. As the gas bag module is usually constructed so as to be movable for actuating the horn, there is a gap between the covering cap and the switches.

The installation of the switches usually requires several parts which, in addition, make it more difficult to predetermine the gap precisely and keep it as small as possible.

It is an object of the invention on the one hand to provide a steering wheel in which fewer parts are necessary and in which, on the other hand, the gap between the covering cap and the switches is small and can be predetermined within narrow limits, which is to be achieved as far as possible with little installation effort at the same time.

BRIEF SUMMARY OF THE INVENTION

According to the invention, a steering wheel comprises a gas bag module having a visible front side with a gas generator carrier on which a gas generator is mounted, and several switches. The gas generator carrier extends to at least close to the front side of said gas bag module and forms at least one section of a common accommodation housing to accommodate said several switches. The carrier may extend not only close to but to the front side of the separate module cover to form a sideward continuation of the module cover. In the steering wheel proposed, the gas generator carrier at the same time also forms the accommodation housing for the switches and therefore has a dual function. In other words, the accommodation housing for the switches is over-sized such that it serves to hold the gas generator at the same time. The numerous intermediate plates which were provided hitherto, by means of which the switches were connected with the skeleton, can be dispensed with. Therefore, also, the association of the switches to the gas bag module is clearly given, so that no long cumulative tolerances can occur.

The switches can be circuit boards, microswitches with their own housing, pressure pieces, button switches or the like, i.e. separate parts which are housed in the common accommodation housing.

Preferably, the gas generator carrier has a shell-like mounting, in which the switches are housed and positioned. According to the preferred embodiment, the switches have their own outer housings which are held in recesses which are preferably constructed in a complementary manner and associated individually therewith. The outer housings project at least partially into these recesses. A form-fitting connection between the outer housing and its recess leads to an exact positioning in place and to a very simple installation, because the switch only has to be inserted with its outer housing into the recess. This can take place, for example, in that the accommodation housing has corresponding recesses or by a mounting plate being used which has corresponding recesses, into which in turn the outer housings of the switches are inserted. The mounting plate with the switches positioned on it in a form-fitting manner thus produces a kind of multifunction switch unit, which can be pre-assembled. This unit is then placed into the common accommodation housing, a form-fitting connection likewise being able to be provided between the mounting plate and the accommodation housing, in order to avoid a separate step of aligning mounting plate and gas generator carrier.

According to the preferred embodiment, the recesses have a square or rectangular shape, in order to prevent a rotation of the switches on installation or during operation.

The part of the outer housing projecting into the recess preferably has an outer contour corresponding to the recess, in order to achieve the form fit.

Several recesses arranged in a row on the gas generator carrier or on the mounting plate can be provided to receive adjacent outer housings. The adjacent switches also thereby have a fixed position with respect to each other, whereby a small and uniform gap distance can be achieved.

In addition, provision can be made that the gas generator carrier has the form of a cup which is open on one side. At least one formed-on section which carries the recess projects from the edge of the opening. The gas generator and gas bag can then be inserted into the "cup". A cup has a base section and a sidewall extending obliquely or under 90° from the base section wherein the sidewall is preferably closed in the circumferential direction.

The steering wheel has a left and a right side in relation to the straight position. Particularly advantageously, the gas generator carrier can at least partially form both on the left and right edges an accommodation housing to accommodate left and right switch panels.

The entire mounting housing is preferably completed in that on the front side switch caps are provided, which for example are guided on the generator carrier. This also provides an exact positional alignment of the switch caps to the module.

An embodiment also makes provision that a covering cap is provided, which closes the outlet opening for the gas bag, the covering cap being fixed to the gas generator carrier. This means that between the covering cap and the usually immediately adjoining switch caps, there is only one part on which both are fastened, namely the gas generator carrier.

A simplification of the construction with respect to the horn switch can be achieved in that the horn switch is likewise fastened to the generator carrier, for example projects with respect to the underside of the accommodation housing and can abut against a part of the steering wheel which is non-movable on displacement, to trigger the horn switch. This takes place when the reversibly displaceably mounted gas generator carrier is pressed in axial direction and displaced.

BRIEF DESCRIPTION OF THE DRAWINGS

FIG. 4 shows a sectional view through a steering wheel of the invention, according to a second embodiment.

DETAILED DESCRIPTION OF THE PREFERRED EMBODIMENTS

Figure 1:
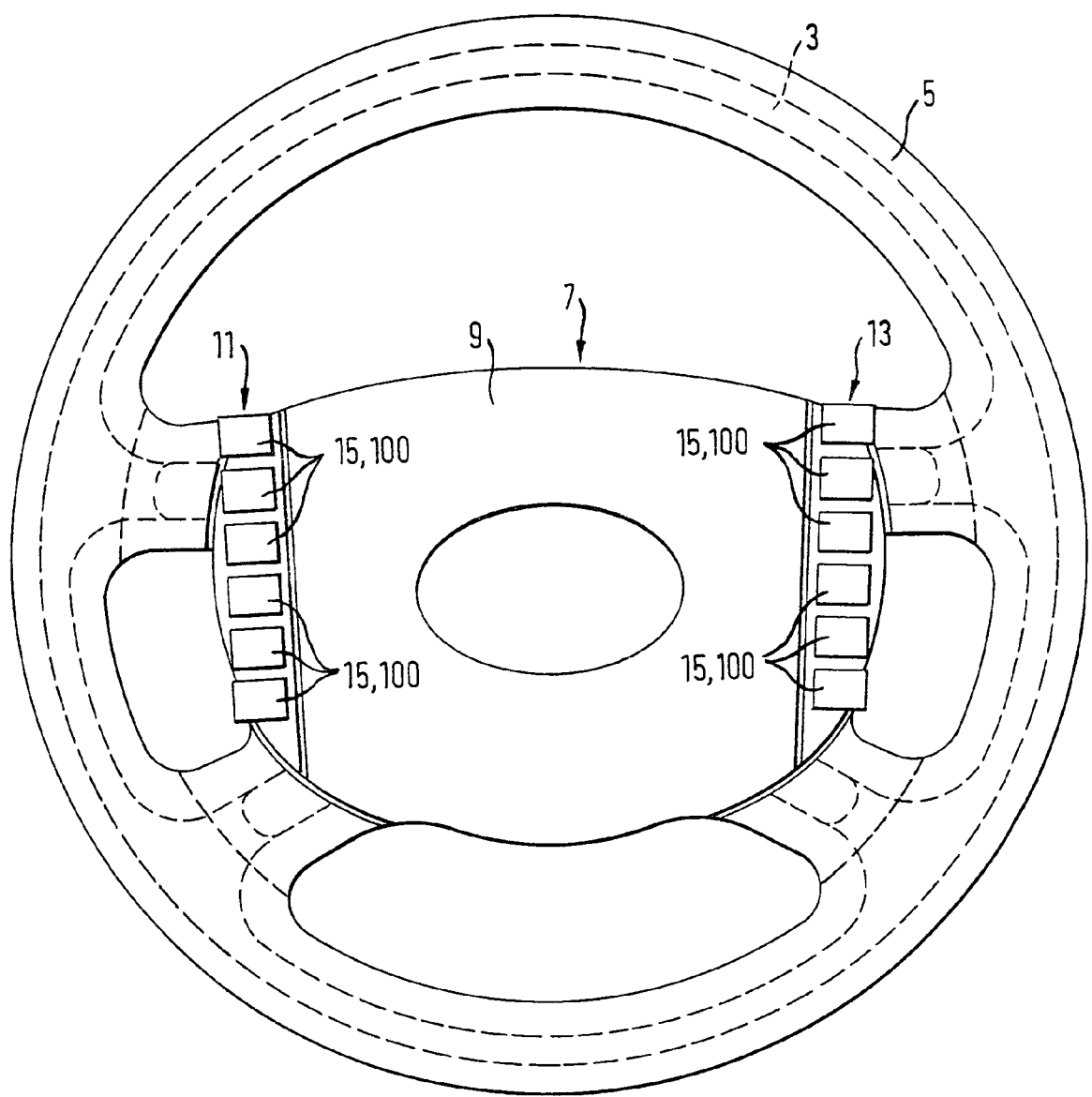
FIG. 1 shows a top view onto a vehicle steering wheel according to the invention.

In FIG. 1 a vehicle steering wheel is illustrated, which has a steering wheel skeleton 3 of sheet metal or cast material, which is provided with a foamed casing 5. In the region of the steering wheel hub 7, a gas bag module is provided with a covering cap 9. On the left and right to the side of the covering cap 9, a row 11, 13 of switches 15 (switch panel) is provided in each case, which are provided for operating an on-board computer, the telephone, radio etc.

Figure 2:
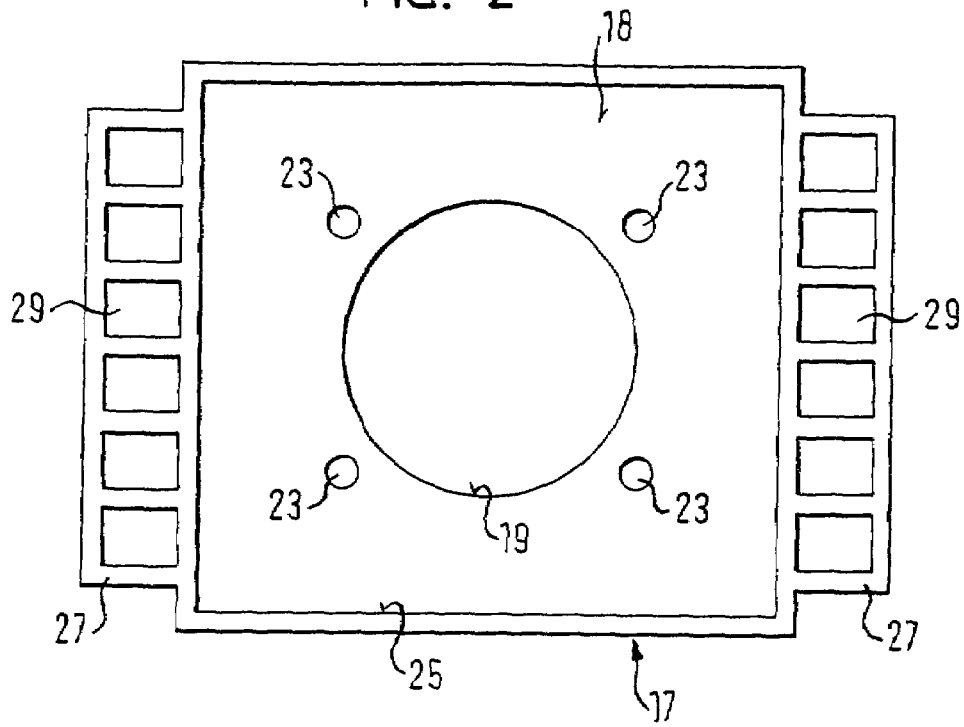
FIG. 2 shows a top view onto the gas generator carrier which is built in the steering wheel according to the invention.
Figure 3:
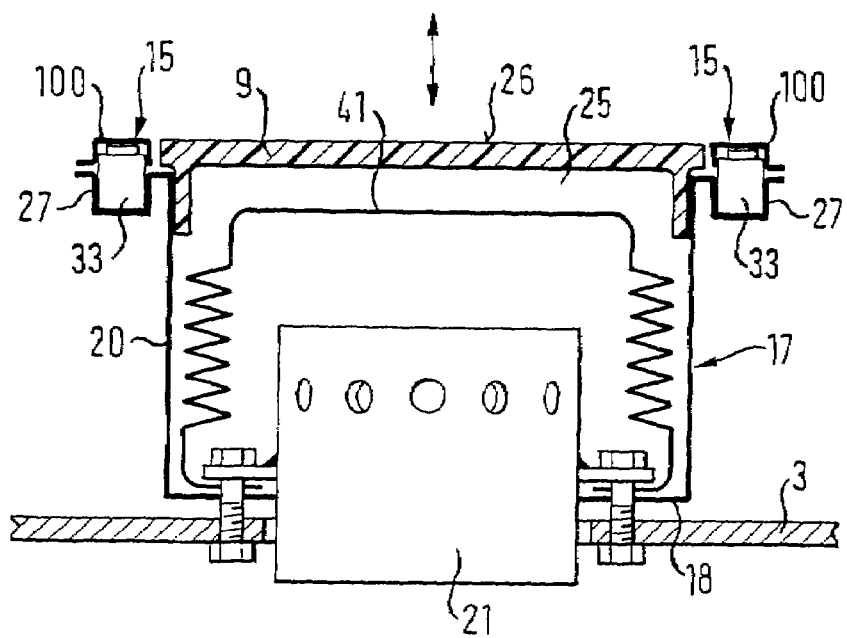
FIG. 3 shows a sectional view through the hub region of the steering wheel shown in FIG. 1.

In FIG. 3 a diagrammatic cross-section through the vehicle steering wheel is illustrated in the region of the hub, the foamed casing 5 being omitted. On the hub side, a cup-shaped gas generator carrier 17 is fastened directly on the skeleton 3 or on an intermediate plate, this fastening also being able to be constructed such that the gas generator carrier is displaceable in the arrow direction with respect to the skeleton 3, for actuating a horn. The gas generator carrier 17 is made of plastic and, as can be seen from FIG. 2, has a base 18 with a mounting opening 19, and a closed surrounding side wall 20. A gas generator 21 projects partially through the mounting opening 19. Fastening openings for the gas generator 21 are designated by 23. A gas bag 41, the gas generator 21, the gas generator carrier 17 and the covering cap 9 substantially form the gas bag module.

Hence, the gas generator carrier 17 shown here is a cup-shaped component, at the base 18 of which the gas generator 21 is directly mounted, or mounted with interposing a further element (gas bag wall, retaining part, reinforcement ring etc.). Adjoining this base is the side wall 20 which extends in upward direction up to the vicinity of the visible front side of the gas bag module.

On the upper edge of the opening 25 of the cup-shaped gas generator carrier 17, close to the covering cap 9, and therefore close to the front side 26 of the module, formed by the visible side of the covering cap 9, sections 27 are formed on the left and right, which project laterally outwards. These sections 27 are each shell-like and have rectangular or square recesses 29, which produce a left and a right row of recesses 29. One individual switch 15 each, constructed as a separate, closed unit, is inserted with its outer housing 33 into these recesses 29, the outer housing 33 of each switch 15 projecting into the corresponding recess 29 and being engaged in a form-fitting manner by the gas generator carrier 17.

The shape of the outer housing 33, at least in the part in which it projects into the recess 29, is constructed so as to be complementary to the recess 29.

The lower parts of the common accommodation housings for the switches 15, formed by the sections 27, are closed by switch caps 100. For each side, a single switch cap 100 can be provided, which has individual sections associated with the individual switches 15. In addition, it would also be possible to construct for each switch 15 its own switch cap 100. The switch caps 100 are preferably positioned and fastened on the gas generator carrier 17 by a form fit.

The generator carrier 17 also serves to hold the gas bag 41. The covering cap 9 closes the cup-shaped accommodation housing formed by the gas generator carrier and laterally directly adjoins the rows 11, 13 of switches 15.

The covering cap 9 laterally directly adjoins the rows 11, 13 of switches and is preferably also positioned directly on the gas generator carrier 17, so that only a very short cumulative tolerance is present between the edge of the covering cap 9 and the adjacent outer housing 33 of each switch 15 or the covering cap 100.

A further advantage of the solution shown for accommodating and positioning the switches 15 consists in that the structural space available is utilized very well by reducing the individual parts. The generator carrier 17 and the switches 15 can also be constructed as a separately pre-mounted assembly.

In the embodiment according to FIG. 4, the references numbers previously already introduced in connection with FIGS. 1 to 3 are used, where these relate to parts having the same function.

In FIG. 4 the so-called "floating horn" mounting of the gas bag module is shown, i.e. the gas bag module is displaceable in axial direction against the force of springs 110 downwards with respect to the skeleton 120 and its foamed casing 130.

It can be readily seen in FIG. 4 that the covering cap 9 adjacent to the front wall also has a peripheral wall which is preferably closed on the periphery, and is given reference number 140. This peripheral wall 140 lies on the inner side against the side wall 20 of the generator carrier 17, whereby a good positioning of these two parts with respect to each other is made possible. On the free edge, the peripheral wall 140 has hook-shaped extensions 142, which can engage into associated openings in the side wall 20, whereby a snap connection is formed.

Also the shell-like sections can be readily seen, which are formed on in one piece on the gas generator carrier 17 on the left and right edge, in relation to the straight position of the steering wheel. The shell-like sections not only have a base, but also a side wall against which cross-pieces 146 of the switch caps 100 lie on the inner side, and are guided.

In contrast to the embodiment according to FIGS. 1 to 3, the switches 15 are pre-assembled on each side of a common mounting plate 150, which can have recesses 29 corresponding to FIG. 2 to receive the outer housings 33 of the switches 15. The switches 15 and the associated mounting plate 150 form a pre-assembled unit. On the underside of each switch plate 150, a horn switch 15' is mounted which projects through a hole in the base of the section 27 and projects downwards with respect to the underside of the base. If the entire module is pressed downwards in the arrow direction, then the horn switch 15' comes in contact with a counter surface on the foamed casing 130 and is actuated.

Also in the embodiment according to FIG. 4, the common accommodation housing for numerous switches is formed by a section 27 (lower shell) and a switch cap 100 (upper shell).

It is to be emphasized that details of the module shown in FIGS. 1 and 3 can also be used with the FIG. 4 embodiment and vice-versa.

The invention claimed is:

1. A steering wheel, comprising a gas bag module having a visible front side (26) with a gas generator carrier (17) on which a gas generator (21) is mounted, and several switches (15), wherein said gas generator carrier (17) extends to at least close to said front side (26) of said gas bag module and forms at least one section of a common accommodation housing to accommodate said several switches (15), wherein said gas generator carrier (17) has a shell shaped mounting in which said switches (15) are housed and positioned.

2. A steering wheel, comprising a gas bag module having a visible front side (26) with a gas generator carrier (17) on which a gas generator (21) is mounted, and several switches (15), wherein said gas generator carrier (17) extends to at least close to said front side (26) of said gas bag module and forms at least one section of a common accommodation housing to accommodate said several switches (15), wherein said gas generator carrier (17) is mounted so as to be reversibly displaceable in a direction of a steering wheel axis, and a horn switch (15') projecting with respect to an underside of said accommodation housing can abut against a part of said steering wheel which is not movable on displacement, to trigger said horn switch (15').

3. A steering wheel, comprising a gas bag module having a visible front side (26) with a gas generator carrier (17) on which a gas generator (21) is mounted, and several switches (15), wherein said gas generator carrier (17) extends to at least close to said front side (26) of said gas bag module and forms at least one section of a common accommodation housing to accommodate said several switches (15), wherein said switches (15) have outer housings (33) which are held in individual, associated recesses (29).

4. The steering wheel according to claim 3, wherein a part of each outer housing (33) projecting into said recess (29) has an outer contour corresponding to its recess (29).

5. A steering wheel, comprising a gas bag module having a visible front side (26) with a gas generator carrier (17) on which a gas generator (21) is mounted, and several switches (15), wherein said gas generator carrier (17) extends to at least close to said front side (26) of said gas bag module and forms at least one section of a common accommodation housing to accommodate said several switches (15), wherein said gas generator carrier (17) has several recesses (29) arranged in at least one row (11, 13) and serving to receive adjacent outer housings (33) of switches (15).

6. A steering wheel, comprising a gas bag module having a visible front side (26) with a gas generator carrier (17) on which a gas generator (21) is mounted, and several switches (15), wherein said gas generator carrier (17) extends to at least close to said front side (26) of said gas bag module and forms at least one section of a common accommodation housing to accommodate said several switches (15), wherein said gas generator carrier (17) has two opposite sides, on which in each case one row of recesses (29) is provided to receive outer housings (33) of switches (15).

7. A steering wheel, comprising a gas bag module having a visible front side (26) with a gas generator carrier (17) on which a gas generator (21) is mounted, and several switches having outer housings (15), wherein said gas generator carrier (17) extends to at least close to said front side (26) of said gas bag module and forms at least one section of a common accommodation housing to accommodate said several switches (15), wherein said outer housings (33) are fastened on a common mounting plate (150) and together with the mounting plate (150) are accommodated in said accommodation housing.

8. The steering wheel according to claim 7, wherein said mounting plate (150) has several recesses (29) arranged in at least one row (11, 13) to receive adjacent ones of said outer housings (33).

9. A steering wheel, comprising a gas bag module having a visible front side (26) with a gas generator carrier (17) on which a gas generator (21) is mounted, and several switches (15), wherein said gas generator carrier (17) extends to at least close to said front side (26) of said gas bag module and forms at least one section of a common accommodation housing to accommodate said several switches (15), wherein said gas generator carrier (17) has the shape of a cup open on one side, with a base (18), a side wall (20) and an opening (25), and at least one section (27) formed on in one piece projects from an edge of said opening (25) and forms a part of said accommodation housing.

10. A steering wheel, comprising a gas bag module having a visible front side (26) with a gas generator carrier (17) on which a gas generator (21) is mounted, and several switches (15), wherein said gas generator carrier (17) extends to at least close to said front side (26) of said gas bag module and forms at least one section of a common accommodation housing to accommodate said several switches (15), wherein said accommodation housing is closed on said front side by switch caps (100).

11. A steering wheel, comprising a gas bag module having a visible front side (26) with a gas generator carrier (17) on which a gas generator (21) is mounted, and several switches (15), wherein said gas generator carrier (17) extends to at least close to said front side (26) of said gas bag module and forms at least one section of a common accommodation housing to accommodate said several switches (15), wherein said steering wheel has left and right sides, in relation to a steering wheel position when driving straight ahead, and that said gas generator carrier (17), both on a left and right edge at least partially forms an accommodation housing to accommodate left and right switch panels.

* * * * *